INVENTOR
Hans Hochrath $$R_n = R_a \left(\frac{m_2}{m_1}\right)^2 + R_t \frac{(n_2^2 - n_1^2)}{n_2^3}$$

United States Patent Office 3,439,280
Patented Apr. 15, 1969

3,439,280
CIRCUIT ARRANGEMENT FOR THE REGULATION OF DYNAMICS OF ELECTRICAL SIGNALS
Hans Hochrath, Munich, Germany, assignor to Siemens Aktiengesellschaft, Berlin and Munich, Germany, a corporation of Germany
Filed Sept. 23, 1965, Ser. No. 489,765
Claims priority, application Germany, Sept. 24, 1964, 593,332
Int. Cl. G06g 7/12; H03k 5/08; H03b 3/02
U.S. Cl. 328—142                                    2 Claims

ABSTRACT OF THE DISCLOSURE

The invention is directed to a circuit arrangement for regulating the dynamics of electrical signals in such a manner as to be usable for compandor systems. The circuit arrangement includes a pair of input terminals and a pair of output terminals, and connected therebetween is a four-pole feedback-free network and a regulating network connected in such a manner as to control the dynamics of the signal passing between the input terminals and output terminals of the circuit.

---

The invention relates to circuit arrangements for the regulation of the dynamics of electrical signals, especially of a message frequency band, and particularly to compressor and expander circuits for compandor systems.

As is known, in compandor systems considerable importance is attached to the reciprocal course of the compressor and expander characteristic curve. In the best solution, thus far, for the realization of the expander, the compressor network is repeated in the feedback path of an amplifier. While this measure does offer considerable advantages over usual voltage divider circuits, it involves a great expenditure in the expander. Because of a tendency of instability, the realization of such a circuit with transistors is possible only with difficulty.

It is the problem of the invention to provide a circuit arrangement which can be utilized as a dynamic compressor and also as a dynamic expander.

To solve this problem, the circuit arrangement for the regulation of the dynamics of the electrical signals is so constructed that in one of the two connection lines from the input terminals to the output terminals of the network there is inserted the output of a regulating network. The regulating network contains at least one non-linear circuit element connected to the input of the regulating network and to either the input or the output of a four-pole feedback-free network. The output circuit of the regulating network and the input terminals of the transmission network, which receive the signal to be altered, are uncoupled against one another.

Through this operation, a circuit arrangement is created which can be utilized at will as a compressor for decreasing the amplitude of the signal or an expander for increasing the amplitude of the signal.

In a further development of the invention, the uncoupling of the output circuit of the regulating network and of the input terminals of the transmission network can be accomplished by applying the signal to the input of a differential transformer which is connected in circuit at the input of the transmission network. In this arrangement, a balancing resistance together with a terminating resistance is connected to the output terminals of the transmission network and to the differential linings of the secondary of the differential transformer thereby forming a balanced bridge circuit. One of the diagonal branches of the bridge circuit is located in the output of the regulating network. The balanced bridge can also be constructed in such a manner as to utilize linear circuit elements rather than the differential transformer.

The uncoupling of the output circuit of the regulating network and of the input terminals of the transmission network can also be accomplished in such a manner that the output terminals of the transmission network are provided with high-resistance. The high-resistance termination of the output terminals of the transmission network may be formed by a cathode follower stage or by a transistor circuit consisting of one or more transistors connected in a collector-common-base circuit. Similarly, the feedback-free four-pole can be constructed as a cathode follower stage or as a transistor circuit consisting of one or more transistors connected in a collector-common-base circuit arrangement.

Feeding the input of the feedback-free four-pole network with the input and output signals of the transmission network is accomplished with the use of one winding of the differential transformer. To provide a feedback-free four-pole with a low-resistance input and a high-resistance output, the feedback-free four-pole can be constructed as a transistor stage operated in a common-base circuit arrangement.

The regulating network containing at least one non-linear circuit element can be constructed as a bridge circuit, particular with the use of a differential transformer. As non-linear circuit elements they can be controlled by a control voltage developed exteriorly of the circuit, particularly by a voltage signal derived free of feed-back information. However, it is expedient to decrease the control voltage from the output of the feedback-free four-pole.

The invention is explained with the aid of the theoretical representations of FIGURES 1 to 5 and with the aid of the examples of construction according to the invention illustrated in FIGURES 6 to 9. In the drawings, wherein like reference characters designate like or corresponding elements:

In the development of high-quality compandor systems, consideration for creating networks having reciprocal adjustability (compressor and expander functions) play an important part. If one considers that it is possible to produce sufficiently uniform bipoles with selected non-linear elements through special adjustment procedures in circuit arrangements appropriate therefore, then this problem is worth taking into consideration only if the transmission factors of the compressor and expander are sufficiently made reciprocal to each other. This requirement, which thus far has been of minor importance, becomes more important in the development of a radio compandor. The method of producing an expander by repeating the compressor in the negative feedback or beta circuit of an amplifier is rather expensive. Nonetheless, there remain drawbacks with, for example, excluded harmonic distortions greater than 6.5 np.

Figure 1:
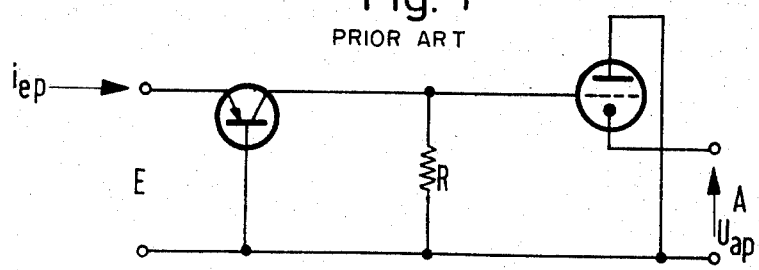
FIGURE 1 illustrates a simple compressor circuit of the prior art.
Figure 2:
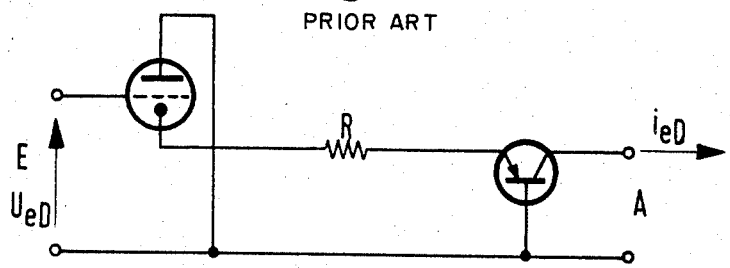
FIGURE 2 illustrates a simple expander circuit of the prior art.

When the bipole properties of a non-linear control system are taken into consideration, the simple tying together of current end voltage via the resistance or conductance thereof forms the basis for the creation of circuit arrangements with reciprocal transmission factors. If the bipole is operated by a linear current, the voltage is proportional to the resistance. Conversely, the current flowing through the bipole is proportional to the conductance when a voltage is applied directly to the bipole. According to this principle, a compressor, as illustrated in FIGURE 1, and an expander, as illustrated in FIGURE 2, can be constructed using the special contrasting properties of tubes and transistors. Thus the tubes having 100% inverse voltage feedback in the cathode follower arrangement with a negligible high-impedance conductance over the connected impedance and further having a negligible low-impedance internal resistance and a voltage transmission factor of approximately unity. These are ideal counterparts of the 100% current-coupled transistor in a cathode follower with a negligible low-impedance input resistance over the externally connected impedance. Additionally, this circuit arrangement includes a negligible high-impedance output internal connection and a current transmission factor of about unity. If the aforesaid negligibles are made in order to obtain a clearer representation of the relation in the arrangements illustrated in FIGURES 1 and 2 and fictitious ideal tubes and transistors are assumed, the transmission factor of the compressor is obtained according to Equation 1 and that of the expander is obtained according to Equation 2.

$$U_{aD}/i_{eD} = R \quad (1)$$
$$i_{aD}/U_{eD} = 1/R \quad (2)$$

Inputs and outputs of the two circuit arrangements can be adjusted in the usual and well known manner to be adaptable to remaining transmission systems, whereby the possibility of the amplification gain can be considered. When the circuit arrangement is constructed as a syllabic compandor, the necessary control voltage can be branched in the usual manner from the output signal of the compressor or the input signal of the expander. The amplification of both the compressor and the expander can be maintained sufficiently large to make additional amplifiers unnecessary. It can be disadvantageous if transistors and tubes have to be employed side by side, for in this case the simple replacement of the cathode follower by a transistor circuit is only possible if the range of adjustment of the non-linear bipole resistors R1 and R2 is relatively small and the losses in the regulating bipole can be taken into consideration. A further disadvantage is the necessity of different constructions of the compressor and expander.

Figure 3:
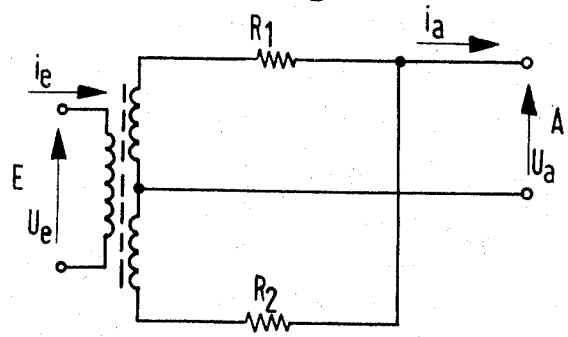
FIGURE 3 illustrates a simple compandor circuit of the prior art utilizing a differential bridge circuit.

Unlike the bipole, one cannot speak of a positive tying together of the current, voltage and resistance in the four-pole circuit. Rather, the transmission constant must be considered. First of all, the voltage transmission factor must be put in the foreground. It is thereby assumed that the feeding generators and a negligible small internal resistance and that the decrease in voltage occurs without losses. A differential bridge circuit is utilized as a regulating network as illustrated in FIGURE 3. The transmission factor is obtained according to Equation 3 under the operating conditions described above.

$$\frac{U_a}{U_e} = e^{-a}\frac{R_2 - R_1}{R_2 + R_1} \quad (3)$$

Whereby, $a$ represents the attenuation of the output voltage $U_a$ to the input voltage $U_e$ of the four-pole changing the dynamics of the signal.

Figure 4:
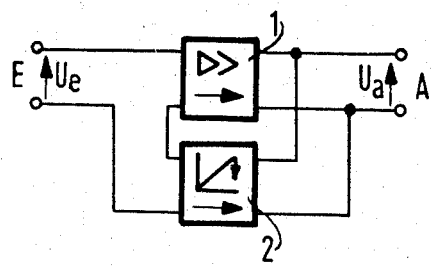
FIGURE 4 illustrates the use of a feedback arrangement in a compressor circuit according to this invention.

It appears that a reciprocal transmission factor cannot be obtained through simple steps. A solution can be found by employing the feedback produced from known amplifier technology. As illustrated in FIGURE 4, the regulating four-pole 2 is so connected to the amplifier 1 having an amplification factor V that the input of the regulating four-pole and the output of the amplifier lies in parallel and the output of the regulating four-pole in series to the amplifier. If a tube amplifier having a large input resistance and a small internal resistance is utilized, Equation 4 is obtained as transmission factor of the inner connections.

$$\frac{U_a}{U_e} = \frac{1}{\frac{1}{V} + e^{-a}}$$

It is apparent that only a limited reciprocity exist between Equations 4 and 3. The demands on the amplifier are great, and if the reciprocity is not to be disturbed by more than 1%, the amplification of the amplifier must be 4.6 np. greater than the attenuation of the regulating four-pole at maximum compression.

For example, with compressor attenuation factor 10 ($e^{-a} = 0.1$) the amplification must amount to about 7 np. Moreover, it must further be taken into consideration that the regulating network considerably burdens the amplifier output. The use of transformers for better resistance matching is difficult, since instability can readily occur.

Figure 5:
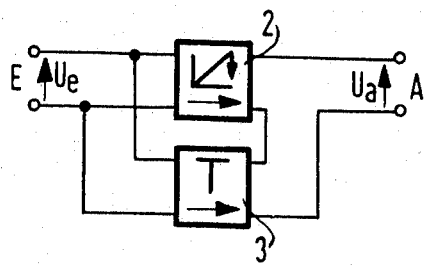
FIGURE 5 illustrates the use of a feedback arrangement in an expander circuit according to this invention.

It is also possible to regard the expander with a transmission factor according to Equation 4 as specified and construct therefor a suitable compressor. This is possible if one selects for the compressor a circuit which is similar to that of the expander (FIGURE 5). Here the inputs of the regulating network 2 and of a four-pole 3, whose transmission value is $1/V$, are connected in parallel, while the outputs are connected in series. If a voltage with low internal resistance is now applied to the circuit and if the output voltage is obtained without loading the circuit, there is obtained as transmission factor the Equation 5.

$$\frac{U_a}{U_e} = \frac{1}{V} + e^{-a} \quad (5)$$

Here there appears to be present an ideal reciprocity between Equations 4 and 5. This, however, is not the case, if there is taken into account the fact that in the expander a true amplifier is employed, while in the compressor it is necessary to produce an attenuation which is inversely proportional to the amplification of the amplifier and which must, in addition, possess the non-linear properties of such amplifier. Production of such an attenuation is hardly possible.

If, however, examination is made of the reciprocity conditions between Equations 4 and 5, it will be ascertained that these do not require the use of an amplifier or of a corresponding attenuation. On the contrary, it is also possible to use a normal linear four-pole with a transmission factor of one. Then, from Equation 4 there now results Equation 6 and from Equation 5 there results Equation 7.

$$\frac{U_a}{U_e} = \frac{1}{1 + e^{-a}} \quad (6)$$

$$\frac{U_a}{U_e} = 1 + e^{-a} \quad (7)$$

The Equations 6 and 7 can be rewritten as follows in 8 and 9:

$$U_a = U_e - U_a \cdot e^{-a} \quad (8)$$
$$U_a = U_e + U_e \cdot e^{-a} \quad (9)$$

It is evident that the input of the regulating network is connected in the one case to the input and, in the second case, to the output of the circuit. There the output of the regulating network must be inserted into the circuit in such a way that this transmission path does not disturb the primary transmission path. Care must be taken, therefore, that the input of the regulating network does not affect a loading of the system, and that its output current does not influence the input current source of the circuit arrangement. The former can easily be achieved by a tube separating stage. Since no amplification is required, a cathode amplifier suffices. For the uncoupling of the input of the circuit and output circuit of the regulating network a fork circuit can be used in known manner.

Figure 6:
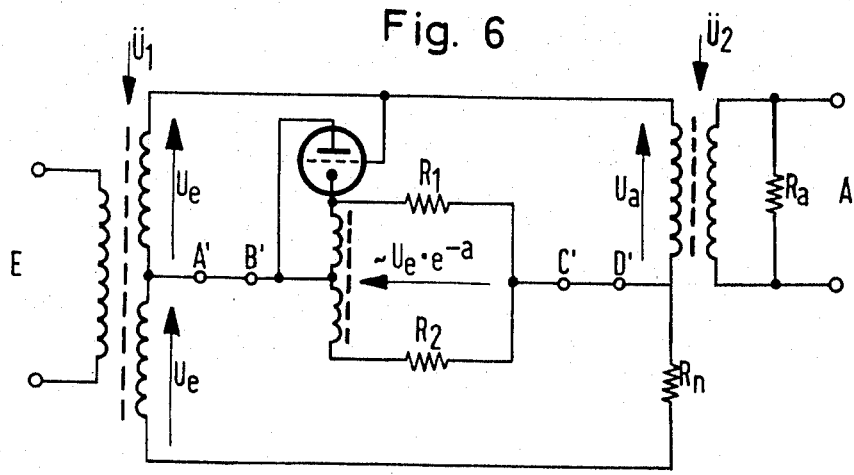
FIGURE 6 illustrates a compandor circuit employing a fork decoupling circuit according to this invention.

FIGURE 6 illustrates a corresponding circuit. Here the output voltage $U_a$ is formed by the sum of input voltage $U_e$ and the input voltage $U_e \cdot e^{-a}$ altered by the regulating network (transmission process according to Equation 9). Here forward regulation is obtained (see also FIGURE 5). In an arrangement according to Equation 8 one would obtain backward regulation and, in the process, also the reciprocal transmission measure. This second possibility is achieved according to FIGURE 6 by simple pole reversal. If the transmission process is to be converted to the ideally reciprocal form, the connections A'–B' and C'–D' are separated and reconnected with A' to C' and B' to D'. The terminals B' and C' are the output terminals of the control network and the terminals A' and D' are the input and output terminals respectively of the transmission network. Then there lies between B' and C' the voltage $U_a \cdot e^{-a}$.

Figure 7:
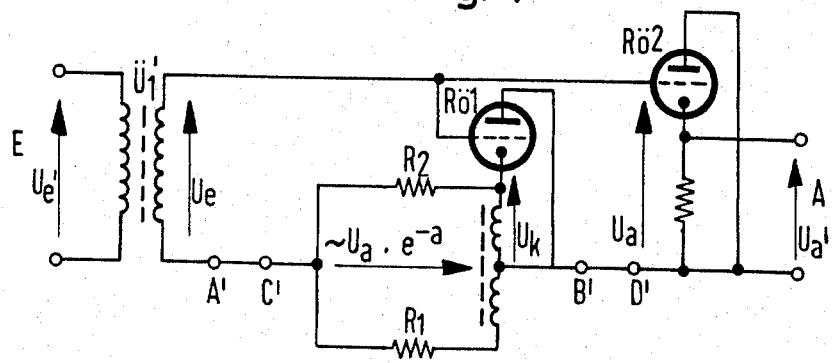
FIGURE 7 illustrates a modified circuit similar to that of FIGURE 6 but in simplified form.

This circuit does not have the great regulating range which is obtained when Equation 3 is substituted in Equation 6. Thus, for one thing, the internal resistance of the cathode amplifier is not negligibly small and, in the second place, through the external resistance $R_a$ and the balancing resistance $R_n$ the regulating network is too severely loaded. The latter can be improved by increase of the transformation ratios of the input transformer $Ü_1$ and output transformer $Ü_2$, but not entirely eliminated. Here it is expedient to connect the output over a tube stage to the fork circuit consisting, in the circuit according to FIGURE 6, of transformer $Ü_1$, the output resistance $R_a$ transformed through transformer $Ü_2$ and the balancing resistance $R_n$. Through this measure the fork now becomes currentless. It is then possible to dispense with the balancing portion and the part thereof belonging to the transformer $Ü_1$ and there is obtained a circuit according to FIGURE 7. Here there is simultaneously effected the pole reversal of the circuit previously mentioned.

There are obtained for this circuit, with consideration of the tube data (inverse amplification D and internal resistance $R_i$) of the cathode amplifier Rö1 the Equations 10 and 11 as internal transmission factor.

$$\frac{U_a}{U_e} = \frac{4DR_i + R_1(1+D) + R_2(1+D)}{4DR_i + R_1 \cdot D + R_2(2+D)} \quad (10)$$

$$\frac{U_a}{U_e} = \frac{4DR_i + R_1 \cdot D + R_2(2+D)}{4DR_i + R_1(1+D) + R_2(1+D)} \quad (11)$$

It is here apparent that the regulation can take place not only by means of $R_1$, but also by means of $R_2$. If $R_1$ is a diode function, there is derived from Equation 10 a compressor and from Equation 11 the reciprocal expander. The situation is reversed if $R_2$ is utilized in the regulation. If it is desired to analyze the difference between the two regulating possibilities, then there must also be considered the voltage which actuates the regulating bipole. In momentary value regulators this is always the cathode voltage $U_k$ of the tube Rö1 (cf. FIG. 7). That is, in the circuit poling for Equation 10, proportional to the output voltage, while in the other poling for Equation 11 is proportional to the input voltage. $R_1$-regulation means backward regulation of the compressor and forward regulation of the expander. The situation is the reverse when $R_2$ is formed as a diode function. This statement can be directly applied to syllabic compandors if the control voltage is obtained merely through amplification, rectification and filtering of the cathode voltage $U_k$. The reciprocity then is not limited only to the transmission factor, but also relates to the controlling voltages.

In the backward-regulated compressor the amplification can be carried maximally between $\mu = 1/D$ and $1/2$. In the forward-regulated compressor the limits lie between 2 and $1/\mu$. It is evident that, depending on the type of regulation, different regulating ranges can be obtained.

The maximal regulating range (ratio of maximal to minimal amplification) amounts to $2\mu$. This regulating range cannot, however, be entirely utilized, since an excessively great dependence of the regulating characteristic curve on the nonlinear, fluctuating tube properties is not permissible. A sufficient feedback, therefore, must remain.

Further improvement results if the different regulating ranges in the forward-regulated and backward-regulated compressor are considered. If it is possible in a simple manner to combine the two circuit possibilities, the regulating range would then extend at least from $\mu$ to $1/\mu$. However, as previously described, the regulating method is determined by the connection of the cathode amplifier to the input and output terminals. There is used expediently, therefore, a circuit in which it is possible to operate the cathode amplifier in such a way that the sum of input and output voltage lies between its grid and its anode. If there is added to the input transformer $U_1$ in FIG. 7 a further winding $W_z$, then there is obtained the circuit according to FIG. 8, with input transformer $U_1''$. For the transmission factor of this circuit it is possible to set forth Equation 12.

$$\frac{U_a}{U_e} = \frac{1+e^{-a}}{1-e^{-a}} \quad (12)$$

With the tube date taken into account, there may set forth Equation 13.

$$\frac{U_a}{U_e} + \frac{4DR_i + R_1D + R_2(2+D)}{4DR_i + R_1(2+D) + R_2D} \quad (13)$$

Thus, in contrast to Equation 10 and Equation 11, $R_1$ and $R_2$ are here equally effective. The regulating range is, therefore, independent of which of the two resistances is used as regulating resistance. The maximal regulating range amounts to $4\mu^2$. The transformation factor is determined largely by the ratio of $R_2$ or $R_1$ according to Equation 14.

$$\frac{U_a}{U_e} = \frac{R_2}{R_1} \quad (14)$$

Both from Equation 13 and Equation 14 it is possible to perceive that the reciprocal circuit is producible by interchanging the resistances $R_1$ and $R_2$. For this purpose in the circuit according to FIG. 8 the bridge terminals A''–B'' and C''–D'' are separated and A'' is connected to D'' and B'' to C''.

In this case, too, the polarity reversal in the circuit relates not only to the signal path but also to the control voltage if this is derived, as before, from the cathode voltage of the tube Rö1. The mixed regulation, therefore, half forward, half backward regulation, can be realized in a simple manner, which has various advantages. Thus, for example, the demands on the feedback conditions in the regulating circuit are considerably modified.

For the explanation of the invention, in the preceding in each case the voltage transmission function was always used. The same considerations can also be carried out with the current transmission function taken as a basis.

Figure 9:
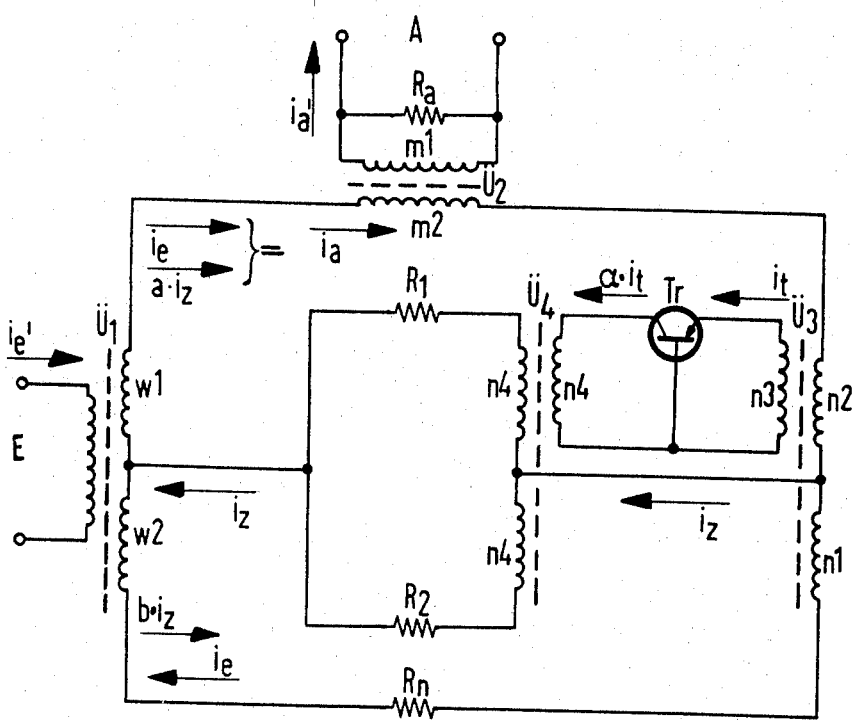
FIGURE 9 illustrates a modified circuit similar to FIGURE 6.

The circuit arrangement illustrated in FIG. 9 corresponds to a modified circuit arrangement according to FIG. 6. It is initially assumed that the input resistance of the transistor is approximately zero. While now the inner input current $i_e$ flows in phase through the transformed external resistance, the windings $n_1$ and $n_2$ of the current decoupling transformer $Ü_3$ as well as the balancing $R_n$, the current $i_z$ from the regulating network is divided according to the ratio of the resistances in the balancing side and the external resistance side of the fork. Accordingly, through the winding $n_2$ of transformer $Ü_3$ there flows the current $a \cdot i_z$ and through the winding $n_1$, in opposite phase thereto, the current $b \cdot i_z$. The transistor input current $i_t$ is thereby determined by Equation 15.

$$i_t = i_c \cdot n_1 + n_2 + i_z\left(a\frac{n_2}{n_3} - b\frac{n_1}{n_3}\right) \quad (15)$$

The additional current $i_z$ corresponds to the transistor output current $\alpha \cdot i_t$ with an attenuation of $e^{-a}$ which is evoked by the regulating network. With consideration of Equation 15 it is possible to write for this additional current Equation 16.

$$i_z = i_e \frac{\frac{n_1+n_2}{n_3} \cdot e^{-a \cdot \alpha}}{1 - a\frac{n_2}{n_3} \cdot e^{-a} \cdot \alpha + b\frac{n_1}{n_3} \cdot e^{-a} \cdot \alpha} \quad (16)$$

Hereby there can be set up the relation 17 between output current $i_a$ and input current $i_e$.

$$\frac{i_a}{i_e} = \frac{1 + \frac{n_1}{n_3} \cdot e^{-a \cdot \alpha}}{1 - e^{-a} \frac{a \cdot n_2 - b n_1}{n_3} \cdot \alpha} \quad (17)$$

By means of this basic formula it is now possible to calculate all transmission states which were treated above in relation to the voltage transmission function, making use of the current transmission function to correspondingly dimension the circuits. If the transmission factor is to appear as in Equation 12, the winding $n_1$ must then be equal to $n_3$ and the winding $n_2$ must be calculated according to Equation 18.

$$n_2 = n_1 \frac{1+b}{1-b} \quad (18)$$

In a symmetrical division of the currents $a \cdot i_z$ and $b \cdot i_z$ the external resistance side is equal to the balancing side of the fork and the winding $w_1$ of the transformer $Ü_1$ is equal to the winding $w_2$. Then $a$ becomes equal to $b$, equal to 0.5. Therefore, $n_2$ must equal $s \cdot n_1$. For the internal transmission factor there is obtained under these circumstances the Equation 19, taking into account the input resistance $R_t$ of the transistor $tr$.

$$\frac{i_a}{i_e} = \frac{2R_a\left(\frac{m_2}{m_1}\right)2 + 8R_t + R_1(1-\alpha) + R_2(1+\alpha)}{2R_a\left(\frac{m_2}{m_1}\right)2 + 8R_t + R_1(1+\alpha) + R_2(1-\alpha)} \quad (19)$$

From this it is apparent that it is desirable to keep the transformed external resistance as small as possible, in order to make it possible to utilize an extremely large regulating range. Half the additional current power is consumed in this case in the balancing. It is possible, however, by increase of the balance resistance and diminution of the transformed external resistance, to achieve a better subdivision of the additional current $i_z$. In the end state the entire additional current flows into the output side. The winding $w_1$ of the transformer $Ü_1$ as well as $b$ become zero and $a$ becomes equal to 1. In this operating state a very great regulating range is obtained if the output $i_a$ is decoupled by means of a transistor which is base circuited. There is then obtained for the inner transmission factor Equation 20.

$$\frac{i_a}{i_e} = \frac{4R_t + R_1(1-\alpha) + R_2(1+\alpha)}{4R_t + R_1(1+\alpha) + R_2(1-\alpha)} \quad (20)$$

Figure 8:
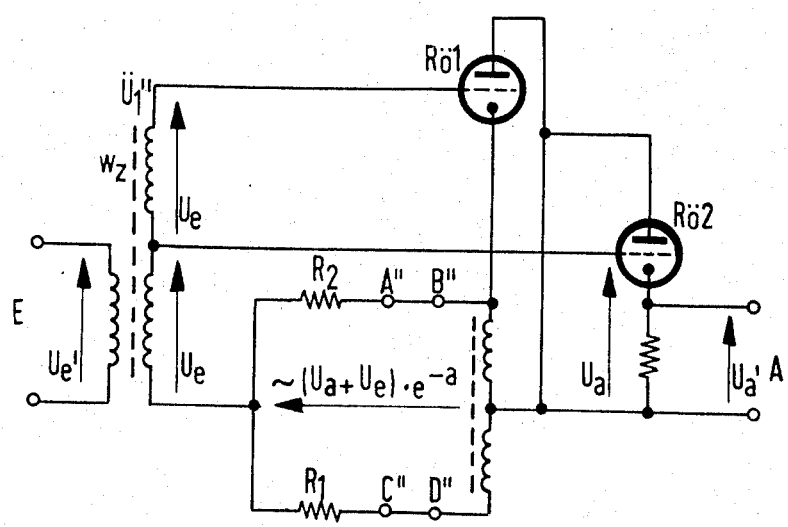
FIGURE 8 illustrates a modified circuit similar to FIGURE 7 employing a further transformer winding.

A comparison with the circuit according to FIG. 8, corresponding to Equation 13, shows the equivalence of the circuit arrangements according to FIGS. 8 and 9, which statement also holds for the change over from compression to reciprocal expansion. The control or regulating circuit necessary in syllabic compandors is expediently connected to the output circuit of the transistor which feeds the regulating four-pole.

Accordingly, the present invention provides a circuit arrangement whereby a single circuit can be used either as a compressor or as an expander merely by reversing existing terminals on the circuit or reversing the rolls played by the non-linear resistors of the regulating network.

I claim:
1. A compander circuit arrangement for regulating the dynamics of electrical signals passing therethrough, comprising: an input transformer having primary and secondary windings; a first terminal connected to one end of said secondary winding; an electron control device having anode, cathode and control electrodes, said control electrode connected to the other end of said secondary winding; a center tap coil having one end thereof connected to said cathode electrode and the center tap thereof connected to said anode electrode; a second terminal connected to the junction of the center top of said coil and to said anode of said electron control device; first and second impedance means each having one end thereof connected together to form a common circuit point and the other ends thereof connected to opposite ends of said center tap coil; a third terminal connected to the common circuit point of said first and second impedance means; a fourth terminal; an output circuit connected between said one end of said secondary winding and said fourth terminal; first circuit means detachably connecting said first and second terminals together; and second circuit means detachably connecting said third and fourth terminals together, whereby, the compander circuit operates as a compressor circuit and reversal of said second and third terminals so as to be connected to said fourth and first terminals respectively will cause said compander circuit to be operated as an expander circuit.

2. A compander circuit arrangement for regulating the dynamics of electrical signals passing therethrough according to claim 1 further including a trinary winding formed on said input transformer, one end of said trinary winding being connected to said first terminal; and a resistor connected between the other end of said trinary winding and said fourth terminal.

References Cited

UNITED STATES PATENTS

| 2,313,014 | 3/1943 | Hagen | 330—146 X |
| 3,076,134 | 1/1963 | Bennett et al. | 330—146 X |
| 2,033,278 | 3/1936 | Fay | 330—145 |

JOHN KOMINSKI, *Primary Examiner.*

J. B. MULLINS, *Assistant Examiner.*

U.S. Cl. X.R.

328—168; 330—146; 333—14